Patented May 6, 1941

2,241,226

UNITED STATES PATENT OFFICE 2,241,226

MANUFACTURE OF CELLULOSE ESTERS CONTAINING UNSATURATED HIGHER ACID RADICALS

Carl J. Malm and Gordon D. Hiatt, Rochester, N. Y., assignors to Eastman Kodak Company, Rochester, N. Y., a corporation of New Jersey No Drawing. Application March 17, 1938, Serial No. 196,472

9 Claims. (Cl. 260—225)

This invention relates to a method of preparing cellulose esters containing unsaturated higher acid radicals in which the esterification is carried out in an oxygen-free atmosphere and the drying of the ester is carried out either in the absence of oxygen or while in contact with an anti-oxidant. In the preparation of unsaturated acid esters of cellulose the lower unsaturated radicals, as a rule, are sufficiently unreactive that they may be employed for esterifying the cellulose without reacting with the oxygen of the air in the esterification. However, to prepare cellulose esters, which are resistant to moisture, it is desirable to employ the unsaturated higher acids which are quite reactive and, if present in appreciable quantities in the cellulose ester, make for gumminess in the reaction mixture. This interferes with the working of the ester which is formed in such a reaction. Our invention is adapted to prevent gumminess in the preparation of cellulose esters, such as cellulose acetate oleate, cellulose acetate linoleate, and also esters in which the higher acyl radicals comprise a mixture of saturated and unsaturated acyls, such as those described and claimed in Fordyce and Hiatt Patent No. 2,170,016. Our invention is applicable to unsaturated acid esters of cellulose in which the unsaturated acid radicals have greater than 10 carbon atoms.

We have found that, if the preparation of the unsaturated acid esters is carried out in the presence of an inert gas or one which is free of uncombined oxygen, gumminess does not occur and the ester may be readily worked up. We have further found that, if the drying is carried out in an oxygen-free atmosphere or if an anti-oxidant is present, a product forms which can be readily dissolved and employed to prepare various products formed. Some of the anti-oxidants which may be employed are those commonly used to prevent the drying of unsaturated oils. Of these we may list hydroquinone, pyrogallol, α-naphthol, m- and p-phenylenediamine and α naphthyl amine.

The unsaturated acid esters of cellulose are particularly useful, due to the fact that they may be shaped or put in the desired physical form and then by treating with heat or light, preferably in the presence of oxygen, they are insolubilized or, in other words, become resistant to the action of organic solvents. With the esters, having radicals containing a large number of carbon atoms, the product also exhibits a high resistance to moisture, oil or other liquids. Therefore, these esters are particularly useful for the protection of materials coated therewith against the action of liquids. For instance, these esters may be employed for the coating of an electrical conductor such as wire, which after insolubilization, such as by treatment with heat or light, may be employed in any connection where the conductor is exposed to the action of liquids, such as in transformers.

There is, however, one disadvantage present, namely, that these esters may insolubilize before they can be dissolved in an organic solvent and worked up into the required shape unless insolubilization, during the esterification and drying, can be prevented. Our invention has for its object the prevention of this insolubilization so that, even though the higher acyl radical consists entirely of unsaturated acyl, nevertheless, the gumming, which would ordinarily be present, is prevented. In making the unsaturated acid esters of cellulose, a soluble cellose derivative, having free and esterifiable hydroxyl groups, such as a lower fatty acid ester of cellulose or a cellulose ether, is used as the starting material. The lower fatty acid esters, which may be employed, are substantially confined to those containing acetyl, propionyl and/or butyryl groups. It is desirable that these derivatives contain at least one hydroxyl group to every $C_6$ unit in order to obtain an ester which can be satisfactorily insolubilized in practice. It is preferred that the cellulose ester be a hydrolyzed type, as this type of ester is more homogeneous than one which has not been completely esterified. The following example illustrates the preparation of a cellulose ester containing an unsaturated higher acid radical in which gumming is prevented in accordance with our invention:

Example I 350 parts of cellulose acetate, containing 38% acetyl, was reacted upon with a mixture of 270 parts of choloroacetic anhydride, 700 parts of methylene chloride, 150 parts of stearic acid, 75 parts of linseed oil acid and one part of magnesium perchlorate at 40° C. for 3–4 hours in an atmosphere of carbon dioxide. A smooth viscous solution was obtained without any gumming occurring. The ester was isolated by precipitation in distilled water and washing with distilled water. Sufficient hydroquinone was added to the final wash water so that the ester retained ½% and the ester was dried. The resulting product was readily soluble in hot toluene, propylene chloride and acetone.

With anti-oxidants of the nature of hydroquinone, which are reactive with acid anhydrides, it is important that the anti-oxidant be added only after the chloroacetic anhydride has been washed out of the ester. Instead of adding an anti-oxidant, the drying could have been conducted in an atmosphere of carbon dioxide or some other inert gas in which oxygen is not present in uncombined condition. The method described for preparing cellulose esters, in which methylene chloride is used as the solvent and sufficient or not quite sufficient higher acid to esterify the starting material is used, may be employed for preparing unsaturated acid esters of cellulose of the type treated of herein.

When using no inert gas during the reaction it is desirable to use a mixture of unsaturated acid: saturated acid not greater than 1:1, i. e. the amount of unsaturated acid should not exceed the amount of saturated acid. The time should not exceed 2 hours.

*Example II*

A solution was made of 5 parts of cellulose acetate, having an acetyl content of 38% in 11 parts of chloroacetic acid and 6 parts of choroacetic anhydride. 0.1 part of magnesium perchlorate in one part of chloroacetic acid was thoroughly mixed therein and 2 parts of stearic acid and one part of linseed oil acids was added. The reaction was run for 1-2 hours at 60° C. The dope was diluted with aqueous acetone which decomposed the excess anhydride present and .08 part of hydroquinone was added. The ester was isolated by precipitating in water, washing and drying.

This ester retained its solubility until completely dried whereas a similar product not treated with hydroquinone rapidly became insoluble in contact with air. This example illustrates that, if the time of reaction is sufficiently short and the amount of unsaturated acid sufficiently small, the reaction might be carried out in the presence of air without excessive gumming occurring. In that case mere drying, in the absence of oxygen or in the presence of an antioxidant, might be sufficient for obtaining a useful commercial product, although even in that case, it is preferred that the reaction be carried out in an atmosphere free of uncombined oxygen to assure a complete absence of gumming.

Instead of carbon dioxide, other gases, which are free of uncombined oxygen and are inert with respect to the materials present in the esterification mixture, such as nitrogen, nitrous oxide or one of the gases from the zero group of the periodic table, could be employed without any gumming occurring.

The lower limit of antioxidant retained by the ester should be about 1 part per 1000 or 0.1%. This allows the ester to be treated at 65° C. for 2-3 hours to remove water but produce no insolubilizing effects. Subsequent treatment at 100° C. for 5-10 hours produces an insoluble product.

The upper limit is of course determined by the speed at which one wants the product to go insoluble. The more antioxidant present, the longer is the high temperature treatment necessary to bring about insolubilization. Thus for practical purposes, this amount should not exceed 3-5% of the weight of the ester. The desirable range is about 0.4-1.5%.

We claim:
1. A process for preparing cellulose esters containing unsaturated acyl groups of more than 10 carbon atoms, which comprises reacting upon a cellulose compound containing free and esterifiable hydroxyl groups with a reaction mixture containing unsaturated acyls of more than 10 carbon atoms in an atmosphere free of uncombined oxygen and subsequently drying the ester under non-oxidizing conditions.

2. A process for preparing cellulose esters containing unsaturated acyl groups of more than 10 carbon atoms, which comprises reacting upon a cellulose compound containing free and esterifiable hydroxyl groups with a reaction mixture containing unsaturated acyls of more than 10 carbon atoms in an atmosphere free of uncombined oxygen and subsequently drying the ester in an atmosphere free of uncombined oxygen.

3. A process for preparing cellulose esters containing unsaturated acyl groups of more than 10 carbon atoms, which comprises reacting upon a cellulose compound containing free and esterifiable hydroxyl groups with a reaction mixture containing unsaturated acyls of more than 10 carbon atoms in an atmosphere free of uncombined oxygen and subsequently drying the ester while in contact with an anti-oxidant.

4. A process for preparing cellulose esters containing unsaturated acyl groups of more than 10 carbon atoms, which comprises reacting upon a cellulose compound containing free and esterifiable hydroxyl groups with a reaction mixture containing unsaturated acyls of more than 10 carbon atoms in an atmosphere free of uncombined oxygen and subsequently drying the ester while in contact with a small amount of hydroquinone.

5. A process of preparing a cellulose acetate-higher acylate, the higher acyl content containing a substantial proportion of unsaturated higher acyl groups which comprises reacting upon a hydrolyzed cellulose acetate with an esterification mixture containing unsaturated acyls of more than ten carbon atoms in an atmosphere free of uncombined oxygen and subsequently drying the ester under non-oxidizing conditions.

6. The process of preparing cellulose acetate-stearate-linoleate which comprises esterifying a hydrolyzed cellulose acetate with a reaction mixture containing unesterified stearyl and linoleyl groups in an oxygen-free atmosphere and subsequently drying the ester under non-oxidizing conditions.

7. The process of preparing cellulose acetate-stearate-linoleate which comprises esterifying a hydrolyzed cellulose acetate with a reaction mixture containing unesterified stearyl and linoleyl groups in an oxygen-free atmosphere and subsequently drying the ester while in contact with an anti-oxidant.

8. The process of preparing cellulose acetate-stearate-linoleate which comprises esterifying a hydrolyzed cellulose acetate with a reaction mixture containing unesterified stearyl and linoleyl groups in an oxygen-free atmosphere and subsequently drying the ester while in contact with hydroquinone.

9. The process of preparing cellulose acetate-stearate-linoleate which comprises esterifying a hydrolyzed cellulose acetate with a reaction mixture containing unesterified stearyl and linoleyl groups in an oxygen-free atmosphere and subsequently drying the ester in the absence of oxygen.

CARL J. MALM.
GORDON D. HIATT.